US 8,934,000 B2

(12) United States Patent
Kane et al.

(10) Patent No.: US 8,934,000 B2
(45) Date of Patent: Jan. 13, 2015

(54) SWITCHABLE 2-D/3-D DISPLAY SYSTEM

(75) Inventors: Paul J. Kane, Rochester, NY (US); Cathleen D. Cerosaletti, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1508 days.

(21) Appl. No.: 12/245,059

(22) Filed: Oct. 3, 2008

(65) Prior Publication Data
US 2010/0085424 A1   Apr. 8, 2010

(51) Int. Cl.
*H04N 13/04* (2006.01)
*H04N 9/31* (2006.01)

(52) U.S. Cl.
CPC ....... *H04N 13/0454* (2013.01); *H04N 13/0438* (2013.01); *H04N 13/0459* (2013.01); *H04N 2213/008* (2013.01)
USPC .................................. 348/53; 348/52; 348/51

(58) Field of Classification Search
CPC .......... H04N 13/0454; H04N 13/0438; H04N 13/0459; H04N 2213/008
USPC ...................................................... 348/51–60
See application file for complete search history.

(56) References Cited

U.S. PATENT DOCUMENTS

| | | | |
|---|---|---|---|
| 4,967,268 A | 10/1990 | Lipton et al. | |
| 5,463,428 A | 10/1995 | Lipton et al. | |
| 6,535,241 B1 | 3/2003 | McDowall et al. | |
| 7,001,021 B2 | 2/2006 | Jorke | |
| 7,180,554 B2 | 2/2007 | Divelbiss et al. | |
| 7,204,592 B2 | 4/2007 | O'Donnell et al. | |
| 7,221,332 B2 | 5/2007 | Miller et al. | |
| 8,029,139 B2 * | 10/2011 | Ellinger et al. | 353/7 |
| 8,159,526 B2 * | 4/2012 | Sato et al. | 348/51 |
| 2006/0061652 A1 * | 3/2006 | Sato et al. | 348/53 |
| 2009/0190095 A1 * | 7/2009 | Ellinger et al. | 353/7 |

\* cited by examiner

*Primary Examiner* — Kenneth Coulter
(74) *Attorney, Agent, or Firm* — Nelson Adrian Blish

(57) ABSTRACT

A system (10) for two-dimensional (2-D) or three-dimensional (3-D) display of images includes a projector (100) for projecting the images; a processor (20) for determining whether to project 2-D or 3-D images; glasses (30) for viewing the 3-D images; a first transmitter (22) for synchronizing the projector with the glasses for viewing 3-D images; a switch (34) in the glasses to detect whether the glasses are on or off; a second transmitter (36) in the glasses for transmitting on/off position information; a receiver (24) for receiving switch position information from the second transmitter; wherein the receiver sends the on/off information to the processor; and wherein the processor switches the projector to project 2-D when the glasses are off.

10 Claims, 3 Drawing Sheets

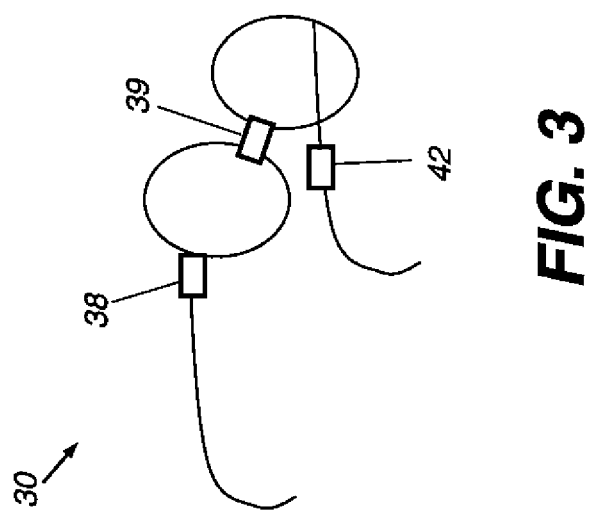

SWITCHABLE 2-D/3-D DISPLAY SYSTEM

CROSS REFERENCE TO RELATED APPLICATIONS

Reference is made to commonly-assigned U.S. patent application Ser. No. 12/021,519, filed Jan. 29, 2008, (now U.S. Pat. No. 8,029,139), entitled 2-D/3-D SWITCHABLE COLOR DISPLAY APPARTUS, by Ellinger et al., the disclosure of which is incorporated herein.

FIELD OF THE INVENTION

The invention relates to display of two-dimensional (2-D) and three-dimensional (3-D) images and in particular a system for switching from 3-D to 2-D when viewing glasses are off.

BACKGROUND OF THE INVENTION

Human three-dimensional visual perception, termed stereo vision, is related to the model human observer having two eyes that are located at two slightly different positions and that form two different viewing perspectives. These two different perspectives are interpreted by the brain and, for most people, effectively "fused" to form a single perspective image. This process, often referred to as binocular fusion, operates upon the disparity between the separate images that are simultaneously formed on the two retinas. Of particular interest for binocular fusion is the relative horizontal displacement of objects in the two images. In binocular fusion, a relative depth between objects is derived, resulting in the perception of a single, broad view with depth.

Stereoscopic display systems, in existence for a number of years, are based on the observation that it is possible to simulate three-dimensional (3-D) images by presenting a pair of two-dimensional (2-D) images separately to each eye, each image offering a different perspective of some captured or simulated scene content. There are a number of examples of 3-D or stereoscopic displays, using various techniques for distinguishing between the image intended for the left eye and the image intended for the right eye. With any type of stereoscopic display system, some type of separation mechanism is needed in order to distinguish the left (L) and right (R) images that appear on a common display, but are respectively intended for the appropriate left and right eyes of the viewers. Left- and right-eye images can be displayed at separate times, can be of different polarizations relatively orthogonal to each other, or can be of different wavelengths. Conventional two-projector systems can use any of these separation schemes or, alternatively a single-projector digital system using various techniques can also use any of these methods.

Time-sequencing systems use a "page flipping" technique and timing for left- and right-eye image separation. Page-flipping alternately displays left- and right-eye images to provide stereo images to one or more viewers wearing shutter glasses that have left- and right-lens opacity synchronized in some manner to the display refresh rates. One example of this type of display system adapted for presenting stereoscopic images to multiple viewers is disclosed in U.S. Pat. No. 6,535,241 (McDowall et al.).

Stereoscopic systems using polarization differences provide the left- and right-eye images using light at respectively orthogonal polarizations. Viewers are provided with polarized glasses to separate these left- and right-eye images. One example of this type of display system using linearly polarized light is shown in U.S. Pat. No. 7,204,592 (O'Donnell et al.). A stereoscopic display apparatus using left- and right-circular polarization is described in U.S. Pat. No. 7,180,554 (Divelbiss et al.).

Stereoscopic systems can separate left- and right-eye images by wavelength and provide viewers with filter glasses that are suitably designed to distinguish the appropriate image for each eye. One example of this type of spectral separation display system is shown in U.S. Pat. No. 7,001,021 (Jorke). 3-D display systems commonly require special eyeglasses to isolate the stereo information presented on the screen and direct that information to the intended eye, left or right. Such eyeglasses may be passive or active, the latter electronically synchronized to the display so as to allow each eye in turn to view only that information intended for that eye, while taking advantage of the limited response time of the human visual system to induce a stereoscopic effect. One example of active electro-optic eyeglasses is disclosed in U.S. Pat. No. 4,967,268 (Lipton et. al.).

To make a display capable of 2-D or 3-D operation, prior art systems require removal of the eyeglasses and manual switching of the display system into a 2-D mode of operation. Some prior art systems, such as U.S. Pat. No. 5,463,428 (Lipton et al.) have addressed shutting off active eyeglasses when they are not in use, however, no communications are made to the display, nor is it then switched to a 2-D mode. U.S. Pat. No. 7,221,332 (Miller et al.) describes a 3-D display switchable to 2-D but does not indicate how to automate the switchover. U.S. patent application Ser. No. 12/021,519 describes a switchable 2-D/3-D display system based on eyeglasses using spectral separation techniques, but again does not address automatic switching between modes.

SUMMARY OF THE INVENTION

Briefly, according to one embodiment of the present invention a system for two-dimensional (2-D) or three-dimensional (3-D) display of images includes a projector for projecting the images; a processor for determining whether to project 2-D or 3-D images; glasses for viewing the 3-D images; a first transmitter for synchronizing the projector with the glasses for viewing 3-D images; a switch in the glasses to detect whether the glasses are on or off; a second transmitter in the glasses for transmitting on/off position information; a receiver for receiving switch position information from the second transmitter; wherein the receiver sends the on/off information to the processor; and wherein the processor switches the projector to project 2-D when the glasses are off.

In another embodiment of the present invention an electronic 2-D/3-D switchable display system, removal of the eyeglasses by the viewer automatically sends a signal to the display system to switch to the 2-D mode in a relatively seamless fashion. Conversely, placing the eyeglasses on the head automatically sends a signal to the display system to switch to the 3-D mode. The invention and its objects and advantages will become more apparent in the detailed description of the preferred embodiment presented below.

BRIEF DESCRIPTION OF THE DRAWINGS

FIG. 3 is a schematic view of stereoscopic eyeglasses, according to the present invention, for viewing switchable 2-D/3-D display images.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
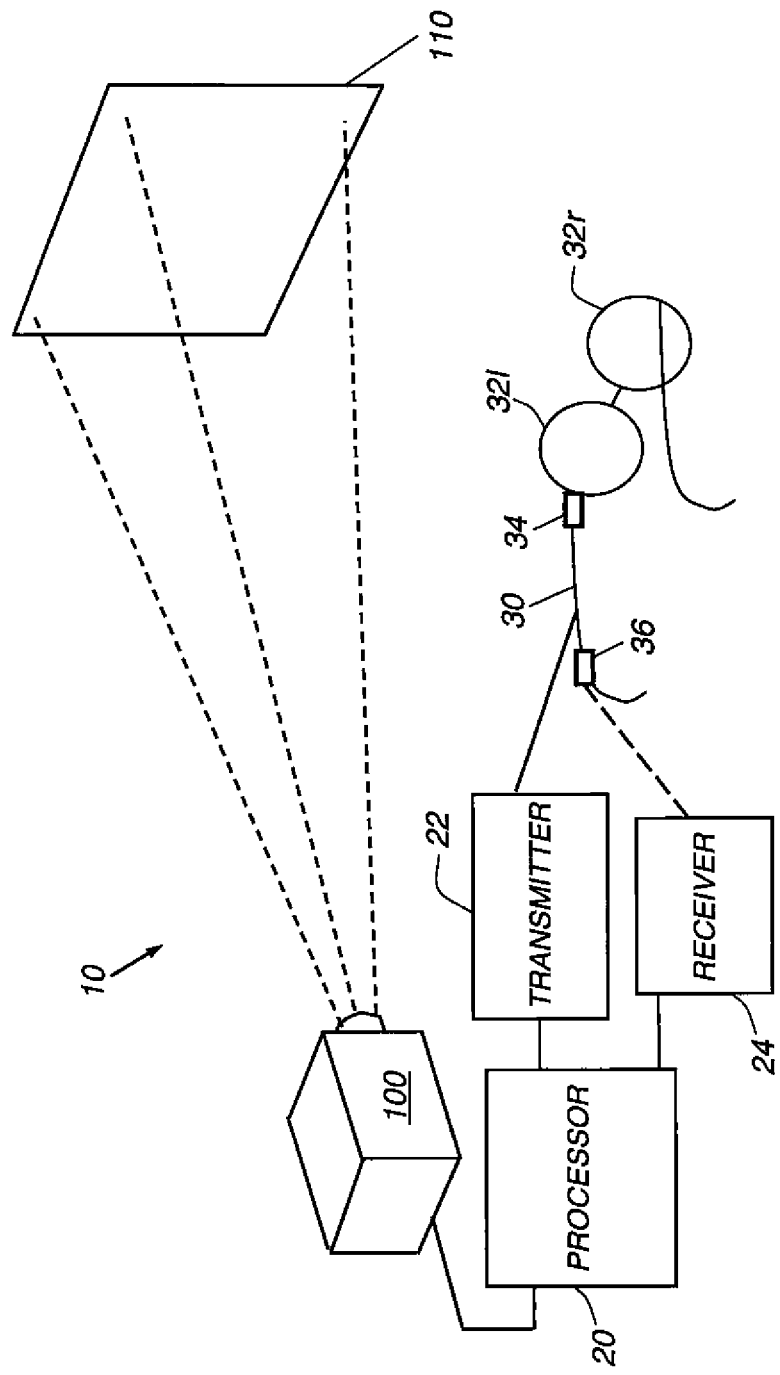
FIG. 1 is a schematic of a switchable of a 2-D/3-D display system according to the present invention.

Referring now to FIG. 1, a system 10 for two-dimensional (2-D) or three-dimensional (3-D) display of images is comprised of a projector 100 for projecting of the images onto a screen 110, a processor 20 for determining whether to project 2-D or 3-D images, glasses 30 for viewing the 3-D images, a first transmitter 22 for synchronizing the projector 100 with the glasses 30 for viewing 3-D images, a switch 34 in the glasses 30 to detect whether the glasses are on or off, a second transmitter 36 in the glasses 30 for transmitting on/off position information from the switch 34, and a receiver 24 for receiving the on/off position information from the second transmitter 36. In embodiments of the present invention, a single projector 100 is used for displaying stereoscopic images to one or more viewers. The projection method for the creation of the stereoscopic 3-D effect can be any of the types previously described, i.e. page-flipping, polarization differences, spectral separation, or other methods that require the viewer to wear eyeglasses to distinguish L and R images. The screen 110 can be of any type, but should be appropriate to the projection method. In one embodiment, a polarization-preserving screen is used with the polarization differences method. In some embodiments, the screen 110 is of the reflecting transmitting type, with the viewer or viewers located on the projector side, while in other embodiments, the screen 110 is of the transmitting type, with the viewer or viewers located opposite to the projector side.

The glasses 30 are also of a type appropriate to the projection method. In all embodiments, the glasses 30 are comprised of a left lens 32l, or other decoding device, and a right lens 32r, or other decoding device, that allow the viewer's eyes to distinguish the L and R images that appear on the screen 110. When these L and R images, which present different perspective views, are simultaneously projected onto the screen 110, or appear within a time interval that is less than the flicker threshold of the human visual system, the stereoscopic 3-D effect is created. The glasses 30 are further comprised of the switch 34 and the second transmitter 36.

Referring to FIG. 3, the switch can be integrated into a hinged component 38, such as the hinge connecting the earpiece and the lens frame. In another embodiment, the switch can be integrated into a pressure-sensitive component 39, such as the nose bridge or any other part of the glasses that contacts the head. In this case the switch senses a decrease in pressure that results when the glasses are removed from the head. In some embodiments, the glasses include an indicator 42, for example a light or other element, which activates when the processor 20 has 3-D information available to project. In such embodiments, the glasses can be in an off state relative to the shuttering or decoding function, but aware of, or sensitive to, signals from the first transmitter 22.

Referring to FIGS. 1 and 3, when first transmitter 22 alerts the glasses that 3-D content is available, the indicator 42 alerts the user, and the act of putting the glasses on enables 3-D projection mode when the return activation signal is sent via second transmitter 36. This is useful for mixed-media presentations that can be composed of 2-D and 3-D elements, where the viewers may wish to remove their glasses between 3-D segments and then be notified when 3-D content has returned.

In one embodiment, the projector uses the page-flipping method of stereoscopic presentation described earlier, in which the processor 20 sends alternating L and R images to the projector 100, and simultaneously sends a synchronization signal to the first transmitter 22 to control the opening and closing of the left lens 32l and the right lens 32r, only when the switch 34 is in the "on" position. The processor 20 is notified that the switch 34 is in the "on" position, indicating that 3-D viewing is enabled, by means of a return signal sent by the second transmitter 36 and received by the receiver 24. When the switch 34 is set to the "off" position, the receiver 24 signals the processor 20 to switch from the 3-D or stereoscopic presentation to drive the projector in a 2-D or monoscopic mode. The receiver 24 can determine that the switch 34 is in the "off" position by a signal sent by second transmitter 36 before or after switch 34 is closed, before switch 34 powers off the glasses 30. In an alternate embodiment, the receiver 24 can determine that the switch 34 is in the "off" position by the absence of any signal from second transmitter 36 for some defined period of time.

Figure 2:
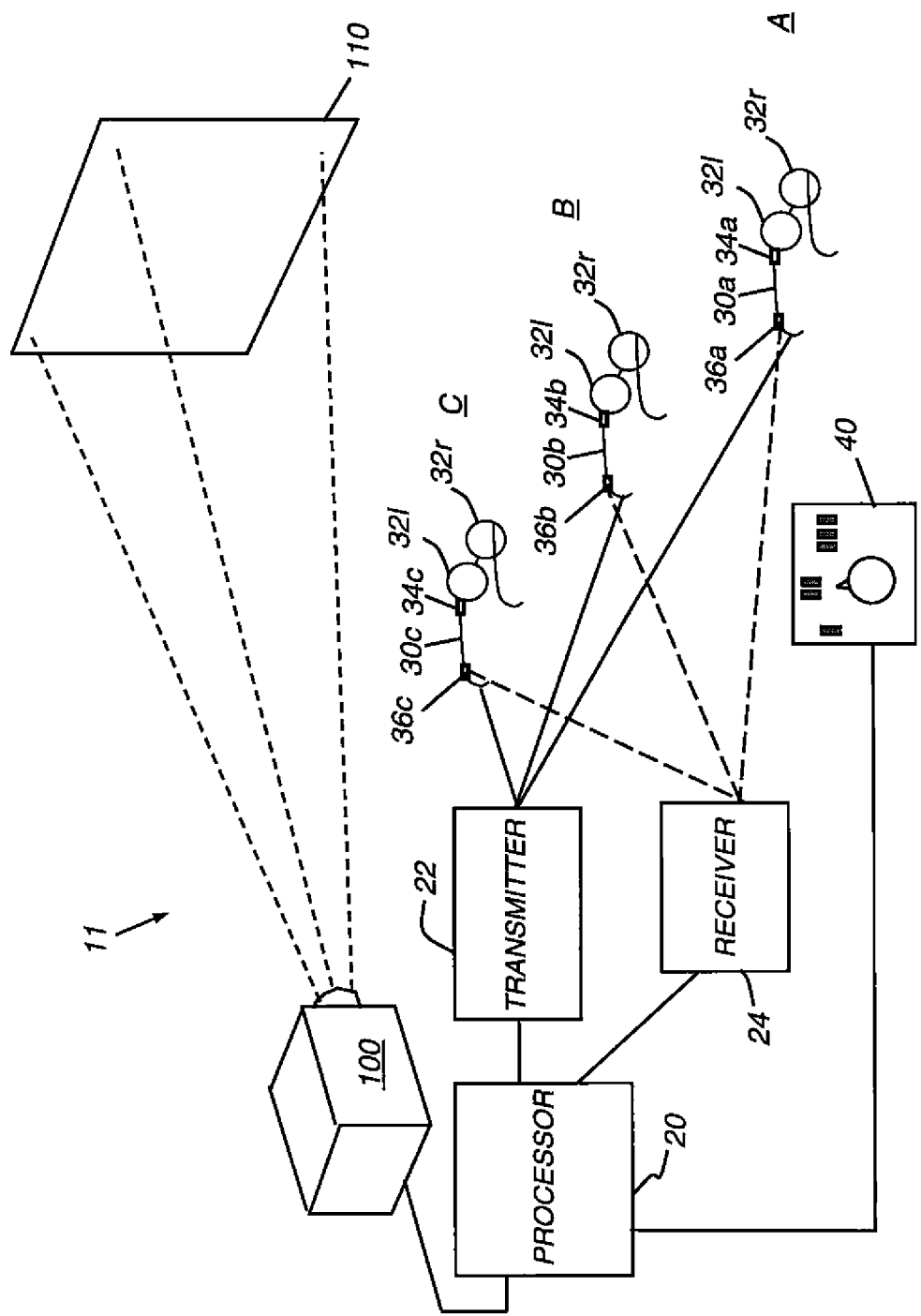
FIG. 2 is a schematic of a multi-viewer switchable 2-D/3-D display system according to the present invention.

Referring now to FIG. 2, an alternate system 11 for two-dimensional (2-D) or three-dimensional (3-D) display of images is comprised of a projector 100 for projecting the images onto a screen 110, a processor 20 for determining whether to project 2-D or 3-D images, glasses 30a, 30b, and 30c for viewing the 3-D images, a first transmitter 22 for synchronizing the projector 100 with all three glasses for viewing 3-D images, switches 34a, 34b, and 34c in the glasses to detect whether each pair of glasses are on or off, second transmitters 36a, 36b, and 36c in the glasses for transmitting on/off position information from the switches 34a, 34b, and 34c, respectively, a receiver 24 for receiving the on-off position information from the second transmitters 36a, 36b, and 36c, and user control 40 for controlling the operation of the processor.

In this embodiment, multiple simultaneous viewers at positions A, B, and C can have their glasses all in the same "on" state, indicating 3-D viewing mode, or all in the same "off" state, indicating 2-D viewing mode, or positions A, B, and C may be in different states. This latter situation creates a conflict between positions that must be resolved. Within the electronics, with the glasses 30a, 30b, and 30c in different states, the receiver 24 receives, and then sends to the processor 20 information indicating that the glasses are in different on/off states. The processor 20 must then determine the correct course of action in driving the projector 100 into a 2-D or 3-D mode. In one embodiment, the course of action depends upon input from the user controls 40, which allow the viewers to select among several modes of operation of the processor. These modes resolve the conflicts between different on/off settings among different viewing glasses. The modes input from the user controls 40 are designed to determine the number and location of the glasses that are necessary to switch the projector to project 2-D. Conversely, these modes determine the number and location of the glasses that are necessary to switch the projector to project 3-D when it is already in 2-D projection mode.

In one embodiment, one set of glasses (for example, A) operates as a unique or master set, so that when its switch (for example, 34a) is set to the off state, and a signal indicating this state is relayed by its second transmitter (for example, 36a) to receiver 24, or equivalently, receiver 24 recognizes that the master glasses are in the off state by the absence of any signal from them, the processor 20 switches from 3-D to 2-D mode and drives the projector 100 to project a 2-D image. This can be accomplished by sending the same perspective image to both L and R eyes, so that there is no parallax on the projected screen image, and the image will look normal to both the unaided eye (without glasses) and through the other viewing glasses. The only perceived difference to any viewers still wearing the glasses will be the absence of the stereoscopic effect. In another embodiment, all glasses at any viewing position (i.e. A, B, or C) have the same effect on the system, so that setting any of the switches 34a, 34b, or 34c to the "off" position, upon detection by receiver 24, will cause the processor 20 to drive the projector 100 from 3-D to 2-D projection mode. It will be apparent to those skilled in the art that these embodiments include the complementary functionality: opening the glasses, i.e. turning them on, can switch the projector from 2-D projection mode to 3-D projection mode.

In yet another embodiment, the glasses are of the electro-optical shuttering type, and the processor causes a different shuttering signal to be sent to at least one pair of glasses. This can be accomplished by transmitting different types of synchronization signals simultaneously using multiplexing. In this embodiment, each pair of glasses has a unique identification known to the processor, and the synchronization signal contains information that designates which glasses can decode which synchronization signals. In some embodiments, certain glasses with switches 34 in the on position are known to the processor 20 to be intended for 3-D viewing, either by viewer preference indicated through a user control 40 supplied to each individual, or through a single master control 40 supplied to one individual, while other glasses are intended for 2-D viewing. Alternatively, the 3-D and 2-D glasses are designated by other means, such as viewers paying a premium in order to see the 3-D presentation. In either case, the shuttering signal for 3-D viewing is different from that for 2-D viewing. In one example, the 3-D shuttering signal consists of two periodic waveforms, one for each of the L and R eyes, 180 degrees out of phase so that one lens is open while the other is closed. Conversely, the 2-D shuttering signal consists of two periodic waveforms, one for each of the L and R eyes, in phase so that both lenses open and close simultaneously.

In an alternate embodiment, the shuttering signals are changed by the processor 20 in response to one or more users' interaction with the projected content, via user controls 40. This includes the playing of an electronic game, instructional, training, educational, exploratory or travel presentations, and the like.

The invention has been described in detail with particular reference to certain preferred embodiments thereof, but it will be understood that variations and modifications can be effected within the scope of the invention.

PARTS LIST 10 system
11 system
20 processor
22 first transmitter
24 receiver
30 glasses
30a glasses
30b glasses
30c glasses
32l left lens
32r right lens
34 switch
34a switch
34b switch
34c switch
36 second transmitter
36a second transmitter
36b second transmitter
36c second transmitter
38 hinged component
39 pressure sensitive component
40 user controls
42 indicator
100 projector
110 screen

The invention claimed is:

1. A system for two-dimensional (2-D) or three-dimensional (3-D) display of images, comprising:
   a projector for projection of the 2-D and 3-D images;
   multiple pairs of glasses for viewing the 3-D images;
   a first transmitter in the projector for synchronizing the projector with the glasses for viewing 3-D images;
   a switch in each pair of glasses to detect whether the glasses are powered on or powered off;
   a second transmitter in each pair of glasses for transmitting power on/power off information;
   a receiver in the projector for receiving power on/power off information from the second transmitters and sending power on/power off information to a processor; and
   a processor for analyzing the power on/power off information received from the second transmitters and determining whether to project 2-D or 3-D images responsive to the analyzed power on/power off information.

2. The system of claim 1, further including a set of user controls, wherein the processor switches the projector to project 2-D when one or more of the glasses are off, depending on the input from the user controls, and wherein the input from the user controls determines the number and location of the glasses that are necessary to switch the projector to project 2-D.

3. The system of claim 2 wherein the processor switches the projector to project 2-D when any one of the glasses is powered off.

4. The system of claim 2 wherein the processor switches the projector to project 2-D when all of the glasses are powered off.

5. The system of claim 2 wherein the processor switches the projector to project 2-D when a unique pair of the glasses is powered off.

6. The system of claim 2 wherein the glasses are of the electro-optical shuttering type, and the processor causes at least two distinct shuttering signals to be transmitted.

7. The system of claim 6 wherein distinct shuttering signals cause some glasses to operate in 3-D mode, and others to operate in 2-D mode.

8. The system of claim 6 wherein the distinct shuttering signals are changed by the processor in response to one or more user interactions with the projected content.

9. The system of claim 6 wherein at least one user control provides input to the processor for overriding on/off position information from one or more pairs of glasses.

10. A system for two-dimensional (2-D) or three-dimensional (3-D) display of images, comprising:
   a projector for projecting of the images;
   multiple pairs of glasses for viewing the 3-D images;
   a first transmitter for synchronizing the projector with the glasses for viewing 3-D images;
   a second transmitter in each pair of glasses for transmitting information;
   a receiver for receiving authorization information from the second transmitter;
   wherein the receiver sends the authorization information to the processor;

a processor for analyzing the authorization information from the second transmitters and determining whether to project 2-D or 3-D images;

wherein the glasses are of the electro-optical shuttering type and the processor causes at least two distinct shuttering signals to be transmitted; and wherein authorization information is programmed into a subset of glasses for a premium price to make the 3-D image available.

* * * * *